United States Patent
Pedrazzi et al.

[11] Patent Number: 5,495,003
[45] Date of Patent: Feb. 27, 1996

[54] 2,2'-DISULFO-4,4'-SUBSTITUTED TRIAZINYLAMINOPHENYL DISAZOSTILBENES

[75] Inventors: Reinhard Pedrazzi, Allschwil; Ulrich Zirngibl, Oberwil, both of Switzerland

[73] Assignee: Sandoz Ltd., Basel, Switzerland

[21] Appl. No.: 330,292

[22] Filed: Feb. 27, 1994

[30] Foreign Application Priority Data

Oct. 30, 1993 [DE] Germany ............... 43 37 181.7

[51] Int. Cl.⁶ ............... C09B 62/09; C09B 35/215; D06P 1/382; D06P 1/39
[52] U.S. Cl. ............... 534/631; 534/691; 8/506; 8/549; 8/681; 8/918; 8/919; 106/22 K; 252/585
[58] Field of Search ............... 534/631, 691; 8/549, 506, 681, 918, 919; 106/22 K; 252/585

[56] References Cited

U.S. PATENT DOCUMENTS 5,095,101  3/1992  von Tobel ............... 534/634

FOREIGN PATENT DOCUMENTS 0040460  11/1981  European Pat. Off. .
3443962  12/1984  Germany .
60-173062  9/1985  Japan ............... 534/631

OTHER PUBLICATIONS

Chemical Abstracts, No. 11, vol. 104:90481a, Disazo Reactive Dyes for Dyeing and Printing (1986).

Primary Examiner—Johann Richter
Assistant Examiner—Fiona T. Powers
Attorney, Agent, or Firm—Robert S. Honor; Carl W. Battle; Carol A. Loeschorn

[57] ABSTRACT

The disazo dyestuffs and mixtures thereof, of the general formula I

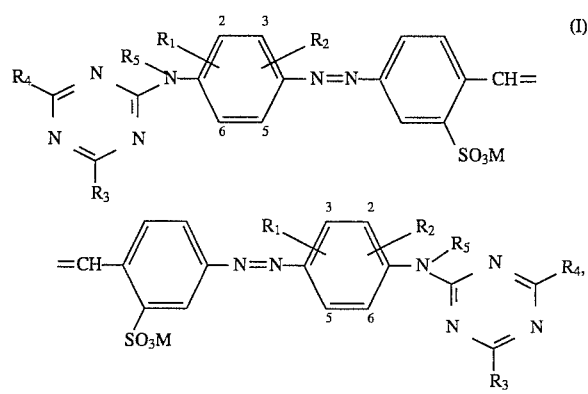

wherein the symbols $R_1$, $R_2$, $R_3$, $R_4$, $R_5$ and M possess the significances given in claim 1, are eminently suitable for dyeing or printing organic substrates containing hydroxyl, thiol or amido groups, especially cotton or paper.

43 Claims, No Drawings

2,2'-DISULFO-4,4'-SUBSTITUTED TRIAZINYLAMINOPHENYL DISAZOSTILBENES

The invention relates to disazo dyestuffs of the stilbene series and mixtures thereof, of the general formula I

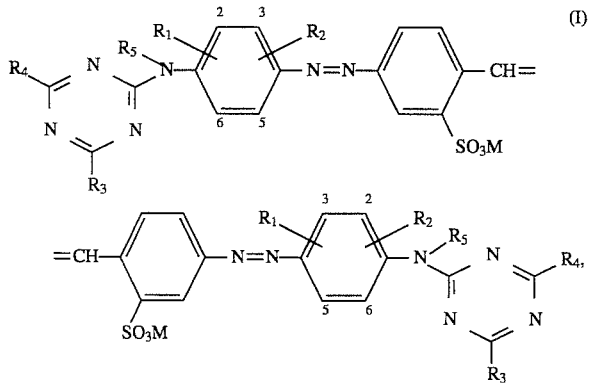

wherein:
- the two $R_1$ independently signify hydrogen or a substituent from the series halogen, amino, alkyl, hydroxy, alkoxy, alkylamino, dialkylamino, acylamino, aryl or aryloxy, or together with $R_2$ or $R_5$ form an optionally substituted carbocyclic or heterocyclic ring,
- the two $R_2$ independently signify hydrogen or a substituent from the series halogen, acyl, alkyl, cyano, carboxyl, acylamino, alkylsulphonyl, phenylsulphonyl, sulphonic acid or alkoxy, or together with $R_1$, form an optionally substituted carbocyclic or heterocyclic ring,
- the two $R_3$ independently signify a substituent from the series chlorine, fluorine, alkyl- or arylsulphonyl, sulphonic acid and optionally further substituted hydroxyl, mercapto, hydrazino and amino,
- the two $R_4$ independently signify an amino group bearing one or two substituents, or a N-morpholyl, N-piperazyl or N-piperidyl group,
- the two $R_5$ independently signify hydrogen or an aliphatic (also cycloaliphatic) radical optionally bearing substituents, or with $R_1$ form an optionally substituted heterocyclic ring, and the two M independently signify hydrogen or a monocationic group and, apart from the fact that $R_3$ may be chlorine or fluorine, no reactive groups are present.

Halogen as a substituent $R_1$ or $R_2$ is understood to be preferably chlorine or bromine, especially chlorine.

The aliphatic radicals are understood to be preferably alkyl radicals, which may bear substituents, preferably hydroxy, alkoxy, carboxy, cyano, phenyl, sulphonic acid and phenoxy.

All alkyl and alkoxy groups preferably contain 1 to 4, especially 1 or 2 carbon atoms. Alkyl is also understood to be cyclic $C_{5-6}$-alkyl groups, which may bear methyl groups, as substituents.

Aryl, also in aryloxy, is preferably phenyl, which optionally bears one or two substituents from the series chlorine, methyl, methoxy, ethoxy, carboxylic acid, sulphonic acid (in salt form), aminocarbonyl, mono- or dialkylaminocarbonyl, aminosulphonyl, mono- or dialkylaminosulphonyl.

Acyl preferably signifies formyl, $C_{1-4}$-alkylcarbonyl, $C_{1-4}$-alkoxycarbonyl, benzoyl, $C_{1-4}$-alkylsulphonyl, phenylsulphonyl, aminocarbonyl or aminosulphonyl.

Hydroxyl, mercapto, hydrazine and amino ($R_3$) may bear e.g. $C_{1-4}$-alkyl or phenyl as substituents. If $R_3$ signifies sulphonic acid, this is generally understood to include a group $SO_3M$. If $R_3$ signifies further substituted amino, this may also be a heterocyclic radical.

The monocationic groups designated as M are either alkali metal ions (lithium, sodium or potassium) or ammonium, mono-, di-, tri- or tetraalkylammonium ions, whereby the alkyl radicals may be further substituted, e.g. by hydroxyl.

The following preferred significances are applicable, independently of the remaining substituents:

- $R_1$ when defined as $R_{1a}$, signifies hydrogen, chlorine, methyl, ethyl, hydroxy, $C_{1-2}$-alkoxy, $C_{1-2}$-alkoxyethoxy, $C_{1-2}$-alkylcarbonylamino, aminocarbonylamino or $C_{1-2}$-alkylsulphonylamino; more preferably when defined as $R_{1b}$, it signifies hydrogen, methyl, methoxy or acetylamino, especially hydrogen,
- $R_2$ when defined as $R_{2a}$, signifies hydrogen, methyl, methoxy, chlorine, carboxy, aminocarbonyl, sulphonic acid or aminosulphonyl; more preferably when defined as $R_{2b}$, it signifies hydrogen, methyl or methoxy, especially hydrogen,
- the ring formed by $R_1$ and $R_2$ is preferably a benzo ring, which may be substituted preferably by a —$SO_3H$ group,
- $R_3$ when defined as $R_{3a}$, signifies chlorine, fluorine, hydroxyl, $C_{1-4}$-alkylmercapto, amino, mono- or di-$C_{1-4}$-alkylamino, whereby the alkyl groups are optionally substituted by hydroxy, alkoxy, carboxy or sulphonic acid, or it signifies phenyl- or toluidylamino substituted by sulphonic acid groups, or N-morpholino; more preferably when defined as $R_{3b}$, it signifies chlorine, fluorine, mono- or di-$C_{1-4}$-alkylamino, whereby the alkyl groups are optionally substituted by hydroxy, alkoxy, carboxy or sulphonic acid, or it signifies phenylamino substituted by sulphonic acid groups,
- $R_4$ when defined as $R_{4a}$, signifies amino, mono- or di-$C_{1-4}$-alkylamino, mono- or di-(hydroxy-$C_{2-4}$-alkyl)-amino, especially mono- and di-(β-hydroxyethyl)-amino, mono- or di-(carboxy-$C_{1-2}$-alkyl)-amino, N-$C_{1-2}$-alkyl-N-(carboxy-$C_{1-2}$-alkyl)-amino, N-$C_{1-2}$-alkyl-N-(hydroxyethyl)-amino, $C_{2-4}$-alkylamino, wherein the alkyl radical bears one or two hydroxyl or carboxylic acid groups or a cyano, sulphonic acid, —O—$SO_3H$, aminocarbonyl, $C_{1-2}$-alkoxy, hydroxyethoxy or carboxymethoxy group, or it signifies a N-morpholyl or a phenylamino group, wherein the phenyl nucleus optionally bears one or two substituents from the series carboxyl, sulphonic acid, hydroxyl, $C_{1-2}$-alkoxy, β-hydroxyethoxy, aminocarbonyl, aminosulphonyl, aminocarbonylamino, hydroxyethylsulphonyl, hydroxyethylaminosulphonyl, or resp. of formula —$OCH_2CH_2OSO_3M$ and —$NHCOCH_2CH_2COOH$, or it signifies naphthylamino optionally bearing up to three sulphonic acid groups; more preferably when defined as $R_{4b}$, it signifies mono- or di-(β-hydroxyethyl)-amino, ethylamino, wherein the ethyl radical bears a carboxylic acid, sulphonic acid, O—$SO_3H$ or hydroxyethoxy group, or it signifies a phenylamino group, wherein the phenyl nucleus bears one or two carboxyl or sulphonic acid substituents, especially sulphonic acid substituents, or it signifies naphthylamino bearing in particular up to three sulphonic acid groups; most preferably when defined as $R_{4c}$, it signifies ethylamino, wherein the ethyl radical bears a sulphonic acid group, or it signifies a phenylamino group, wherein the phenyl nucleus bears one or two sulphonic acid substituents, or it signifies naphthylamino bearing up to three sulphonic acid groups,
- $R_5$ when defined as $R_{5a}$, signifies hydrogen, $C_{1-4}$-alkyl or hydroxy-$C_{2-4}$-alkyl; more preferably when defined as $R_{5b}$, it signifies hydrogen, and
- M when defined as $M_a$, signifies hydrogen, a lithium, sodium or potassium ion or a cation of formula $NH_4^+$, $(C_{1-4}alkyl)_{1-4}$-ammonium or (hydroxy-$C_{2-4}$-alkyl)$_{1-4}$-ammonium.

It is preferable for the similarly designated symbols $R_1$, $R_2$, $R_5$ to have the same significance, which also means that the compounds of formula II (see below) used as intermediate products are preferably symmetrical. It is also preferable for the end products of formula I to be symmetrical.

Preferred compounds possess the formula Ia

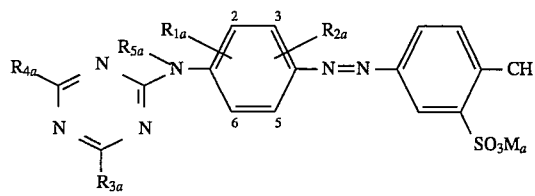

(Ia)

wherein the symbols $R_{1a}$, $R_{2a}$, $R_{3a}$, $R_{4a}$, $R_{5a}$ and $M_a$ possess the above significances, the symbols $R_{1a}$ and $R_{2a}$ may also form a benzo ring, which may be substituted preferably by a —$SO_3H$ group.

Similarly preferred compounds possess the formula Ia, wherein the two $R_{1a}$'s and the two $R_{2a}$'s respectively are identical.

Further preferred compounds possess the formula Ia, wherein the two $R_{1a}$'s and $R_{2a}$'s respectively are identical, and $R_{4a}$ has the significance of $R_{4c}$ as indicated above.

Other preferred compounds possess the formula Ia, as above, wherein the symbols $R_{1a}$, $R_{2a}$, $R_{3a}$, $R_{4a}$ and $R_{5a}$ possess the significance of $R_{1b}$, $R_{2b}$, $R_{3b}$, $R_{4b}$ and $R_{5b}$ as indicated above, and $M_a$ is defined as above.

Preferred compounds possess the formula Ia with the symbols in the significances indicated above, and they are symmetrical. The symmetrical compounds with $R_{3a}$ or $R_{3b}$=Cl are preferred in particular.

One especially preferred compound possesses the formula (1)

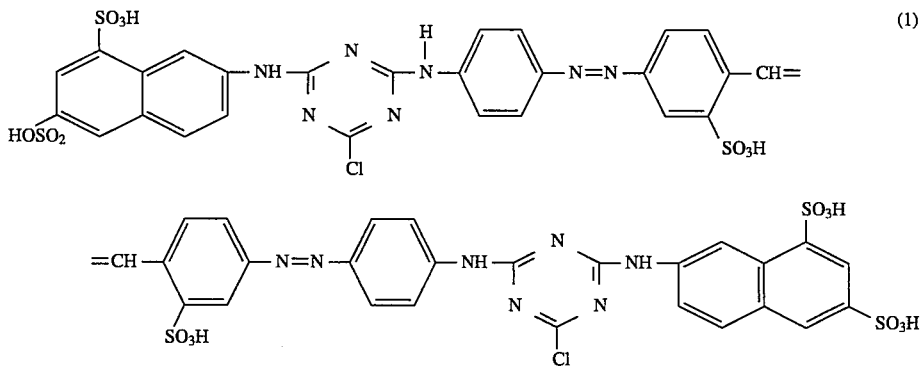

(1)

Production of the dyestuffs of formula I takes place in a manner, which is conventional for disazo dyestuffs of this kind and is familiar to the person skilled in the art, by means of the condensation of one mol of a compound of formula II

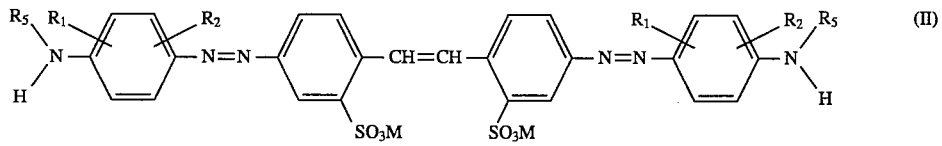

(II)

with 2 mols of a compound of formula III

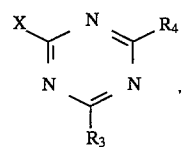

(III)

whereby X signifies a halogen atom, preferably fluorine or chlorine.

The compounds of formula I may also be produced by the condensation of one mol of a compound of formula II with 2 mols of cyanuric halide and the further condensation with 2 mols of a compound of formula H-$R_4$ and, if $R_3$ should have a significance other than fluorine or chlorine, with 2 mols of a compound H-$R_6$, wherein $R_6$ has the significance of $R_3$, but without chlorine or fluorine.

Preferably, both $R_4$'s and both $R_6$'s respectively are chemically identical groups, so that the dyestuffs of formula I are fully symmetrical.

However, if mixtures of $R_4$ and/or $R_6$, that are chemically different, are used, mixtures of symmetrical and asymmetrical dyestuffs are obtained, which similarly have very good properties.

Production of the compounds of formula II, as well as the indicated condensation processes, are effected analogously to processes for the production of similar known compounds.

A compound of formula I produced according to the above process may be used per se in the form of the solution obtained; however, the solution may also be converted into a solid by drying, e.g. spray drying. Furthermore, the isolation method which is usual for dyestuffs, namely salting out of the solution, filtering and drying, is also suitable.

The type of cations assigned to the sulpho groups in a compound of formula I may be influenced in various ways in accordance with the process; these are known methods throughout. In particular, mixed salts may be obtained by well-directed control of the process employed.

The compounds according to the invention in the form of their water-soluble salts are used for dyeing or printing organic substrates containing hydroxy groups, thiol groups or nitrogen, in particular as paper dyes, direct dyes or reactive dyes.

The compounds of formula I, wherein $R_3$ is fluorine or chlorine, may be used as cold or hot dyeing reactive dyes; they are suitable for dyeing or printing hydroxy group containing or nitrogen-containing organic substrates. Preferred substrates that may be mentioned are fibrous materials which consist of or contain natural or regenerated cellulose, such as cotton, viscose or rayon staple fibre. The substrate which is usually preferred is textile material consisting of or containing cotton. These compounds may be employed in dye liquors or in printing pastes in all the dyeing or printing processes that are customary for reactive dyes. Dyeing is preferably effected by the exhaust process in a temperature range of 40°–70° C., resp. 60°–100° C. The compounds according to the invention show good compatibility with known reactive dyes; they may be used alone, or because of their good combinability, also in combination with suitable reactive dyes of the same class, which have comparable dyeing properties, e.g. regarding all-round fastness or exhaust capability. The combination dyeings obtained have good fastness, which is comparable with that of dyeings made with individual dyes.

As a result of their high substantivity, the compounds according to the invention are also very suitable as direct dyes. The usual technical application processes are employed as dyeing and printing processes. Natural and regenerated cellulose, e.g. cotton, are preferably dyed by a conventional exhaust process at dyeing temperatures of 50°–100° C.

The dyestuffs according to the invention are notable for their depth of colour, and produce good exhaust and fixation values respectively. The dyeings obtained (especially on cotton and paper) are of pure shade.

On the said substrates, the dyeings generally have very good wet fastness and good light fastness. The very good water and perspiration fastness and good fastness to peroxide, perborate and chlorine may also be mentioned, as well as the good washability for reactive dyeings.

The wet fastness of the direct dyeings and reactive dyeings on cellulosic textile materials may be decisively improved by means of a special after-treatment with selected assistants. In particular, the washing fastness is improved such that its quality level does not undergo any reduction even after repeated washes at 60°.

A suitable assistant for this after-treatment may be a fixing agent in the form of a pre-condensate or mixture, which is obtained either A) from the product of reacting the mono- or polyfunctional primary or secondary amine with cyanamide, dicyandiamide, guanidine or biguanidine; or of ammonia with cyanamide or dicyandiamide, whereby the product contains reactive hydrogen atoms bonded to nitrogen, or B) from a quaternary polyalkylene-polyamine with C) a N-methylol compound of a urea, melamine, guanamine, triazinone, urone, carbamate or acid diamide, optionally in the presence of D) a catalyst for cross-linking with a N-methylol compound of type C.

Details relating to the assistant in the form of the combination A/C/D are described in detail in PCT application publication no. WO 81/02 423; details on the combination B/C/D may be found in German Published Specification DOS 31 37 404.

Printing is effected by means of impregnation with a printing paste which is prepared by a known method.

The new dystuffs may also be used for dyeing or printing leather, preferably chrome-tanned types of leather, using methods known per se. In addition, the dyestuffs may be used to produce inks by a method known per se.

The compounds of formula I may also be employed in the form of dye preparations. This application form is especially preferred for dyeing paper. The processing into stable liquid, preferably aqueous, concentrated dye preparations may take place in a generally known manner, advantageously by dissolving in water, optionally adding an assistant, e.g. a hydrotropic compound or a stabilizer. It is particularly advantageous to produce such stable, aqueous-concentrated preparations during the course of dyestuff synthesis without intermediate isolation of the dyestuff.

The stability of the dyestuff preparation during storage, resp. the solubility of the dyestuff employed, may be further improved by the additional content of a hydrotropic compound.

Hydrotropic compounds are described e.g. in H. Rath and S. Müller, Melliand Textilberichte 40, 787 (1959) or E. H. Daruwalla in K. Venkataraman, The Chemistry of Synthetic Dyes, Vol. VIII, pages 86–92 (1974).

Suitable hydrotropic assistants are for example low molecular weight amides, lactones, alcohols, glycols or polyols, low molecular weight ethers or hydroxyalkylation products, as well as nitriles or esters; those which preferably come into consideration are methanol, ethanol, propanol; ethylene-, propylene-, diethylene-, thiodiethylene- and dipropyleneglycol; butanediol; β-hydroxypropionitrile, pentamethyleneglycol, ethyleneglycolmonoethyl and propylether, ethylenediglycolmonoethylether, triethyleneglycolmonobutylether, butylpolyglycol, formamide, dimethylformamide, pyrrolidone, N-methylpyrrolidone, glycol acetate, butyrolactone, urea and ε-caprolactam.

One favourable composition of such liquid preparations is for example as follows (parts are by weight):

| | |
|---|---|
| 100 | parts of a compound of formula I as a water-soluble salt, |
| 1–100, | preferably 1–10, parts of an inorganic salt, |
| 100–800 | parts of water, |
| 0–500 | parts of one of the above-listed hydrotropic compounds. |

Depending on the salt form, the liquid preparations may exist as suspensions or also, preferably, as true solutions. The preparations are stable and may be stored over a long period of time.

The compounds of formula I may similarly be processed into solid, preferably granulated, dye preparations, advantageously by granulating as described in French Patent Specification no. 1.581.900.

One favourable composition for solid preparations is for example as follows (parts are by weight):

| | |
|---|---|
| 100 | parts of a compound of formula I as a water-soluble salt, |
| 1–100, | preferably 1–10, parts of an inorganic salt, |
| 0–800 | parts of a standardizing agent (preferably non-ionogenic, such as starch, dextran, sugar, grape sugar or urea). |

The solid preparation may contain up to 10% residual moisture.

Depending on the cations or cation mixtures assigned to the sulpho groups, the compounds of formula I possess good solubility properties and are notable for their good solubility in cold water. Furthermore, in the production of sized and also unsized paper, the waste waters are not coloured at all, or only to a slight extent. The dyes do not mottle on paper, are substantially insensitive towards fillers and pH variations, and only have a slight tendency to produce two-sided effects on paper; no loss of shade or colour change is observed either in an alkaline or acidic range.

The dyeings on paper have good light fastness, and after long-term exposure to light, the shade alters tone-in-tone. The dyed papers have very good wet fastness towards water, milk, fruit juices, sweetened mineral water and tonic water, and in addition have good alcohol fastness. The dyestuffs have high substantivity, i.e. they are absorbed practically quantitatively, and thus have good build-up; they may be added to the paper pulp directly, i.e. without previously dissolving, as a dry powder or granulate, without reducing the brilliance or yield of colour. However, it is advantageous to use those true solutions of the dyestuffs, as indicated above, which are stable, of low viscosity and thus may be measured easily.

Production of the paper dyeings with the described dyestuffs may also take place in soft water.

The dyestuffs of the present invention may similarly be employed in the production of transparent, optically polarizing sheets or films (e.g. of PVA, viscose or the like).

The following examples serve to illustrate the invention. If not otherwise stated, the parts and percentages in the examples are by weight; the temperatures are indicated in degrees celsius. 1 part by volume corresponds to the volume of one part by weight of water at +4° C.

EXAMPLE 1

(production of the dyestuff of formula (1)

is obtained; any excess nitrite is destroyed with sulphaminic acid. Afterwards, the suspension is allowed to pass, over the course of 2 hours, into a preparation containing 97 parts of aniline-ω-methanesulphonic acid, 500 parts of water and 150 parts of ice, whereby the pH is maintained at 4–5 through the simultaneous, careful addition of a 20% sodium acetate solution. When coupling has ended, 300 parts of a 30% caustic soda solution are added. As soon as the protecting group has been completely cleaved, the pH value is adjusted to 7–8 with 30% hydrochloric acid. The resultant suspension is filtered off, and 300 parts of a moist presscake are obtained. It contains 122 parts of the intermediate product of formula (2)

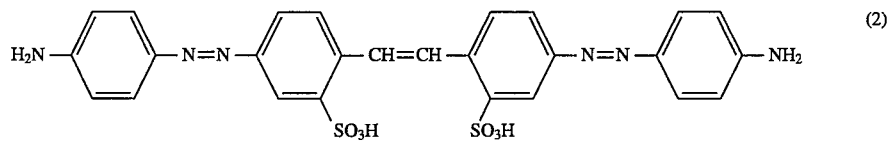

The presscake is stirred into 2500 parts of water of 45°, mixed over the course of 30 minutes with ca. 2000 parts of an aqueous suspension containing 200 parts of 2,4-dichloro-6-(6', 8'-disulphonaphthyl-2)-aminotriazine, whereby the temperature is maintained at 40°–45° and the pH is maintained at 7–7.5. As soon as condensation has ended, 460 parts of sodium chloride are added in portions whilst cooling, the pH is adjusted to 6.5 with hydrochloric acid, and then filtration is carried out. After drying, 530 parts of a brownish powder are obtained, which contains 292 parts of the dyestuff of formula 1 given above (as a sodium salt). It dyes cellulosic materials in brilliant, golden yellow shades with very good fastness. The outstanding light fastness is especially notable. The $\lambda_{max}$-value of the dyestuff is 426 nm (measured in DMF/water 1:1).

The 2,4-dichloro-6-(6',8'-disulphonaphthyl-2)-aminotriazine may be produced e.g. as follows:

134 parts of 2-aminonaphthalene-6,8-disulphonic acid are dissolved in 850 parts of water with 30% caustic soda solution at pH 6.7, and allowed to pass over the course of 30 minutes into a preparation containing 82 parts of cyanuric chloride and 200 parts of ice water. The pH is maintained at 5 with the assistance of a ca. 20% sodium carbonate solu-

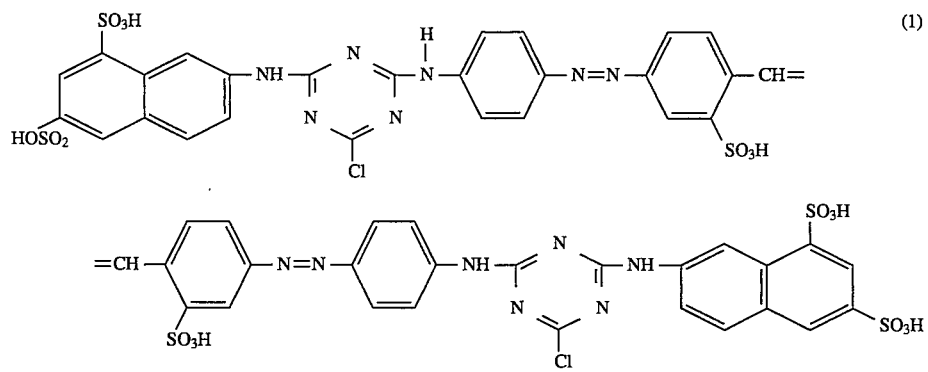

92.5 parts of 4,4'-diaminostilbene-2,2'-disulphonic acid are stirred into 1500 parts of water, dissolved with 30% caustic soda solution at pH 7–8, and mixed with 35.2 parts of sodium nitrite, dissolved in 60 parts of water. This solution is allowed to pass into a preparation, containing 172 parts of 30% hydrochloric acid and 250 parts of ice, such that the temperature does not exceed 6°. A brown diazo suspension tion, and the temperature is held below 6° with ice. Stirring is effected for 1 hour at pH 5 and at a temperature of below 6°, then the suspension may be used directly for production of the dyestuff according to example 1. The volume is ca. 2000 parts by volume, and contains ca. 200 parts by weight of the product.

EXAMPLE 2

141 parts of the dyestuff from example 1 are stirred into 800 parts of water, and mixed with 43 parts of diethanolamine. The mixture is subsequently heated to 80°–90° and this temperature is maintained for 3 hours. After this time, the reaction is complete. The dyestuff solution is stirred until cold, and mixed with 100 parts of sodium chloride. The dyestuff of formula 1, in which the chlorine is replaced by the group of formula —$N(CH_2CH_2OH)_2$, is precipitated. After filtering and drying, a reddish powder is obtained, which dyes paper in golden yellow shades. The wet fastness and in particular the light fastness are excellent.

EXAMPLE 3

If the dyestuff of formula 1, according to example 1, is not treated with sodium chloride, but instead is strongly acidified with hydrochloric acid, it precipitates in free acid form. The dyestuff thus obtained is filtered, the presscake dissolved in 1000 parts of water and 500 parts of diethanolamine, and in this way a stable, ready-to-use solution of the dyestuff of formula 1 is obtained in the form of the hexasulphonic acid hexakis-diethanol-ammonium salt.

EXAMPLE 4

By using lithium hydroxide instead of the diethanolamine in example 3, and thus setting a pH value of 7, the dyestuff of formula 1 is obtained as the lithium salt.

Further dyestuffs (Examples 5 to 58) of the general formula 1a

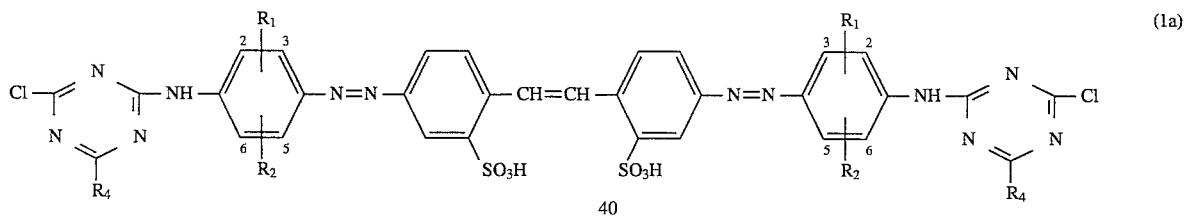

may be produced analogously to the procedure given in example 1 (see Table 1 ).

Similarly, further dyestuffs of general formula Ib (examples 59–60; Table 2) may be produced analogously to the procedure given in Example 1.

Likewise, dyestuffs of the general formula Ic (Examples 61, 62; Table 3) may be produced analogously to the procedure given in Example 1.

In the following tables the entry "do." is intended to mean the same or ditto as the entry preceding it.

TABLE 1

(Formula 1a)

| Exp. No. | R$_4$ | R$_1$ | R$_2$ | Shade |
|---|---|---|---|---|
| 5. | —NH—C$_6$H$_4$—SO$_3$H (para) | 2-OCH$_3$ | H | yellowish orange |
| 6. | " | " | 5-CH$_3$ | orange |
| 7. | " | 2-CH$_3$ | " | yellowish orange |
| 8. | " | H | " | " |
| 9. | " | 2-OCH$_3$ | 5-OCH$_3$ | orange |
| 10. | " | H | 3-NHCOCH$_3$ | brownish |
| 11. | —HN—C$_6$H$_4$—SO$_3$H (meta) | H | H | golden yellow |
| 12. | —HN—C$_6$H$_3$(SO$_3$H)$_2$ (2,5-disulfo) | H | 3-CH$_3$ | " |
| 13. | —HN—C$_6$H$_3$(SO$_3$H)$_2$ (2,4-disulfo) | H | H | golden yellow |
| 14. | —HN—naphthyl(SO$_3$H)$_2$ (1,5-disulfo) | H | H | " |
| 15. | —HN—naphthyl(SO$_3$H)$_3$ (trisulfo) | H | H | " |
| 16. | —HNC$_2$H$_4$SO$_3$H | H | H | " |
| 17. | —N(CH$_3$)CH$_2$CH$_2$SO$_3$H | H | H | " |
| 18. | —NH—C$_6$H$_3$(SO$_3$H)(COOH) | H | H | golden yellow |
| 19. | —NH—C$_6$H$_3$(SO$_3$H)(COOH) | H | H | " |

TABLE 1-continued (Formula 1a)

| Exp. No. | R₄ | R₁ | R₂ | Shade |
|---|---|---|---|---|
| 20. | —NH—C₆H₄—COOH (3-COOH) | H | H | " |
| 21. | —NH—C₆H₄—COOH (4-COOH) | H | H | " |
| 22. | —NH—C₆H₄—SO₃H | H | 3-NH-CONH₂ | brownish yellow |
| 23. | —NH—C₆H₃(SO₃H)₂ | H | H | golden |
| 24. | —NH—naphthyl(SO₃H)₂ | H | H | golden yellow |
| 25. | —NH—C₆H₄—SO₃H | H | H | golden yellow |
| 26. | —NH—naphthyl(SO₃H)₂ | H | H | " |
| 27. | —NH—C₆H₄—SO₂NHCH₂CH₂OH | H | H | yellowish orange |
| 28. | —NH—C₆H₄—SO₂NHCH₂CH₂OSO₃H | H | H | yellowish orange |
| 29. | —NH—C₆H₄—SO₂CH₂CH₂OH | H | H | " |
| 30. | —NH₂ | H | H | golden yellow |
| 31. | —NHCH₂CH₂OH | H | H | " |
| 32. | —N(CH₃)CH₂CH₂OH | H | H | " |
| 33. | —N(CH₂CH₂OH)₂ | H | H | " |
| 34. | —NHCH₂CH₂COOH | H | H | " |
| 35. | —NHCH₂—C₆H₄—SO₃H | H | H | " |

TABLE 1-continued (Formula 1a)

| Exp. No. | R$_4$ | R$_1$ | R$_2$ | Shade |
|---|---|---|---|---|
| 36. | —NH—(naphthalene-1,3-disulfonic acid, 6-yl) | H | H | " |
| 37. | —NH—(benzene-3,5-disulfonic acid, 1-yl) | H | H | golden yellow |
| 38. | —NH—(naphthalene-1-sulfonic acid, 6-yl) | H | 3-NHCOCH$_3$ | brownish yellow |
| 39. | —N(morpholino) | 5-NHCOCH$_3$ | 2-SO$_3$H | brownish yellow |
| 40. | —NHCH$_2$CH$_2$SO$_3$H | H | 3-NHCOCH$_3$ | " |
| 41. | —N(CH$_2$COOH)$_2$ | H | H | golden yellow |
| 42. | —NH—(naphthalene-4,8-disulfonic acid, 1-yl) | H | H | golden yellow |
| 43. | —NH—(2-sulfophenyl) | H | H | golden yellow |
| 44. | —NH—(2-methyl-4,6-disulfophenyl) | H | H | golden yellow |
| 45. | —NH—(naphthalene-4,8-disulfonic acid, 2-yl) | H | H | golden yellow |
| 46. | —NH—(naphthalene-1,3,6-trisulfonic acid, 7-yl) | H | H | golden yellow |

TABLE 1-continued (Formula 1a)

| Exp. No. | R₄ | R₁ | R₂ | Shade |
|---|---|---|---|---|
| 47. | −NH−CH₂CH₂−SO₃H | H | 3-NHCONH₂ | orange |
| 48. | −NH−CH₂CH₂−SO₃H | H | 3-NHCONHCH₃ | orange |
| 49. | −NH−C₆H₃(SO₃H)−N=N−C₆H₄−SO₃H | H | H | yellow |
| 50. | −NH−CH₂CH₂−OSO₃H | H | H | yellow |
| 51. | −NH−CH₂CH₂−SO₃H | H | 3-CH₃ | reddish yellow |
| 52. | −NH−CH₂CH₂−OSO₃H | H | 2-CH₃ | reddish yellow |
| 53. | −NH−(naphthyl-1,3-disulfonic acid) | 2-OCH₃ | 5-NHCOCH₃ | orange brownish |
| 54. | −NH−(naphthyl-1,3-disulfonic acid) | 2-OCH₃ | H | yellowish orange |
| 55. | −NH−(naphthyl-1,3-disulfonic acid) | 2-OCH₃ | 5-CH₃ | orange |
| 56. | −NH−(naphthyl-1,3-disulfonic acid) | 2-OCH₃ | 5-OCH₃ | orange |
| 57. | −NH−(tetrahydrothiophene-1,1-dioxide) | H | H | brownish yellow |
| 58. | −NH−C₆H₄−SO₃H | 3-OH | H | orange |

TABLE 2

(Formula 1b)

| Exp. No. | R$_4$ | R$_5$ | Shade |
|---|---|---|---|
| 59. | —NH—C$_6$H$_4$—SO$_3$H | —CH$_2$CH$_2$OH | yellow |
| 60. | —NH—C$_6$H$_4$—SO$_3$H | —CH$_2$COOH | yellow |

TABLE 3

(Formula 1c)

| Exp. No. | R$_4$ | R$_1$ + R$_2$ | R$_5$ | Shade |
|---|---|---|---|---|
| 61. | —NH—C$_6$H$_4$—SO$_3$H | —C$_6$H$_4$—SO$_3$H | H | orange |

| | | R$_2$ | R$_1$ + R$_5$ | |
| 62. | —NH—(naphthyl-1,3-(SO$_3$H)$_2$) | SO$_3$H | H | —(CH$_2$)$_2$— | yellow |

The following table shows the $\lambda_{max}$ values for the dyestuffs of Examples 5–62 measured in solvents (A), (B), (C) and (D). The identity of the solvents is indicated at the end of the table.

| Exp. No. | $\lambda_{max}$ in nm |
|---|---|
| 5. | 438 (C) |
| 6. | 447 (C) |
| 7. | 422 (C) |
| 8. | 431 (C) |
| 9. | 451 (C) |
| 10. | 450 (C) |

-continued

| Exp. No. | $\lambda_{max}$ in nm |
|---|---|
| 11. | 424 (B) |
| 12. | 430 (C) |
| 13. | 426 (C) |
| 14. | 426 (C) |
| 15. | 426 (C) |
| 16. | 423 (C) |
| 17. | 424 (C) |
| 18. | 422 (B) |
| 19. | 420 (B) |
| 20. | 427 (C) |
| 21. | 426 (C) |

| Exp. No. | λ_max in nm |
|---|---|
| 22. | 479 (C) |
| 23. | 425 (C) |
| 24. | 426 (C) |
| 25. | 427 (C) |
| 26. | 426 (C) |
| 27. | 429 (C) |
| 28. | 425 (C) |
| 29. | 426 (C) |
| 30. | 425 (C) |
| 31. | 427 (C) |
| 32. | 428 (C) |
| 33. | 429 (C) |
| 34. | 427 (C) |
| 35. | 427 (C) |
| 36. | 426 (C) |
| 37. | 426 (C) |
| 38. | 453 (C) |
| 39. | 445 (C) |
| 40. | 449 (C) |
| 41. | 428 (C) |
| 42. | 427 (C) |
| 43. | 426 (C) |
| 44. | 427 (C) |
| 45. | 427 (C) |
| 46. | 426 (C) |
| 47. | 465 (C) |
| 48. | 470 (C) |
| 49. | 389 (C) |
| 50. | 426 (B) |
| 51. | 430 (C) |
| 52. | 430 (C) |
| 53. | 484 (C) |
| 54. | 439 (C) |
| 55. | 449 (C) |
| 56. | 452 (C) |
| 57. | 433 (D) |
| 58. | 460 (C) |
| 59. | 410 (C) |
| 60. | 410 (C) |
| 61. | 453 (C) |
| 62. | 435 (C) |

Solvents::
1% soda solution (A)
1% % acetic acid (B)
Mixture of dimethylformamide and water 1:1, adding thereto 1% ammonium acetate (C)
Dimethylformamide + 1% acetic acid (D)

The dyestuffs of formula 1d to 1k in Tables 4–10 may be produced analogously to the procedures given in Example 2;

TABLE 4

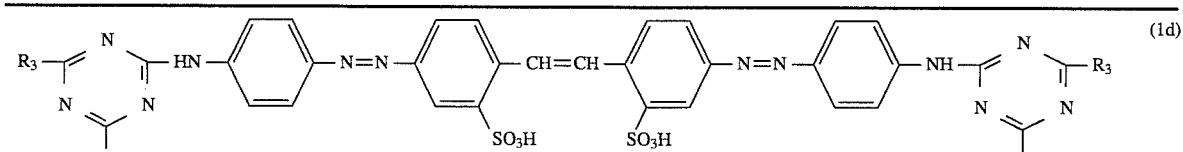

(Formula 1d)

| Exp. No. | R_3 | R_4 | Shade | λ_max. nm |
|---|---|---|---|---|
| 63. | —N(CH_2CH_2OH)_2 | —NH—⬡—SO_3H | yellow | 430 |
| 64. | —N(CH_3)CH_2CH_2SO_3H | " | " | 432 |
| 65. | —OH | " | " | 435 |
| 66. | —NHCH_2CH_2OCH_2CH_2OH | " | " | 431 |
| 67. | —N(morpholino) | " | yellow | 433 |
| 68. | —N(piperazinyl)N—CH_2CH_2OH | " | " | 430 |
| 69. | —NHCH_2CH_2OH | —NH—(naphthalene-1,3-disulfonic acid) | yellow | 430 |
| 70. | —NHCH_2COOH | " | " | 430 |
| 71. | —NHCH_2CH_2SO_3H | —NH—⬡—SO_3H (meta) | " | 429 |

TABLE 4-continued

Formula (1d):

R₃-C(=N-)-N=C(R₄)-N=C(-NH-C₆H₄-N=N-C₆H₃(SO₃H)-CH=CH-C₆H₃(SO₃H)-N=N-C₆H₄-NH-)-N=C(R₃)-N=C(R₄)- (triazine-NH-phenyl-azo-phenyl(SO₃H)-CH=CH-phenyl(SO₃H)-azo-phenyl-NH-triazine)

| Exp. No. | R₃ | R₄ | Shade | λ_max. nm |
|---|---|---|---|---|
| 72. | —N(CH₂CH₂OH)₂ | —NH—C₆H₃(SO₃H)₂ (2,5-disulfo anilino) | " | 428 |
| 73. | —NH—C₆H₄—SO₃H | —NH—C₆H₄—SO₃H | " | 430 |
| 74. | —S—CH₂CH₂COOH | " | " | 432 |
| 75. | —SO₃H | " | " | 427 |
| 76. | —NHCH₂CH₂OH | —NHCH₂CH₂OH | " | 434 |
| 77. | —N(CH₃)CH₂CH₂SO₃H | —NHCH₂CH₂OH | yellow | 428 |
| 78. | " | —N(CH₃)CH₂CH₂SO₃H | " | 430 |
| 79. | —N(CH₃)CH₂CH₂OH | —NH—(naphthyl-1,3-disulfonic acid) | " | 433 |
| 80. | —NHCH₂CH₂COOH | —NH—(naphthyl-1,5-disulfonic acid) | " | 434 |
| 81. | —NH₂ | —NH—(naphthyl-1,3,5-trisulfonic acid) | " | 432 |
| 82. | —NH₂ | —NH—C₆H₃(SO₃H)—N=N—C₆H₄—SO₃H | " | 406 |
| 83. | —NH₂ | —NH—C₆H₃(SO₃H)(COOH) | yellow | 432 |
| 84. | —NH(CH₂)₃OCH₃ | —NH—(naphthyl-1,3-disulfonic acid) | " | 435 |

TABLE 4-continued (Formula 1d)

| Exp. No. | R₃ | R₄ | Shade | $\lambda_{max}$, nm |
|---|---|---|---|---|
| 85. | $-NH_2$ | " | " | 433 |
| 86. | $-NH_2$ | $-NH-\text{C}_6\text{H}_4-SO_3H$ | " | 432 |
| 87. | $-NHCH_2CH_2OH$ | " | " | 430 |
| 88. | $-NH(CH_2)_3OCH_3$ | " | " | 434 |

Further suitable dyestuffs correspond to formula 1e; 1f; 1g; 1h; 1i; 1j and 1k.

TABLE 5

(Formula 1e)

| Exp No | R₁ | R₂ | R₃ | R₄ | Shade | $\lambda_{max}$ |
|---|---|---|---|---|---|---|
| 89 | 3-CH₃ | H | $-NH-\text{C}_6\text{H}_4-SO_3H$ | $-N(CH_2CH_2OH)_2$ | golden yellow | 440 |
| 90 | 2-OCH₃ | H | $-NHCH_2CH_2OH$ | $-NH-$naphthyl$(SO_3H)_2$ | " | 446 |
| 91 | H | 3-NHCOCH₃ | $-NHCH_2CH_2SO_3H$ | $-NH-\text{C}_6\text{H}_4-SO_3H$ | brown yellow | 455 |
| 92 | 2-OCH₃ | 5-CH₃ | $-NH-\text{C}_6\text{H}_4-SO_3H$ | $-NH(CH_2CH_2O)_2H$ | orange yellow | 454 |

TABLE 6

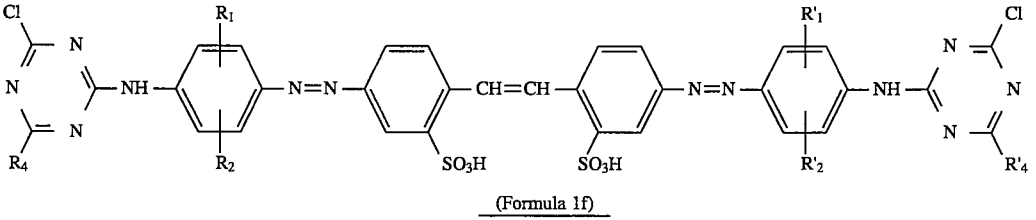

(Formula 1f)

| No. | R₁ | R'₁ | R₂ | R'₂ | R₄ | R'₄ | Shade |
|---|---|---|---|---|---|---|---|
| 93. | H | H | H | H | —NH—C₆H₄—SO₃H (para) | —NH—C₆H₃(SO₃H)(HOSO₂) | yellow |
| 94. | 3-CH₃ | 3-CH₃ | H | H | " | " | golden yellow |
| 95. | H | H | 2-OCH₃ | 2-OCH₃ | " | " | golden yellow |
| 96. | H | H | H | H | " | —NH—naphthyl(SO₃H)(HOSO₂) | yellow |
| 97. | 3-NHCOCH₃ | =R₁ | H | H | " | " | reddish yellow |
| 98. | H | H | H | H | —NH—C₆H₄—SO₃H (meta) | —NH—naphthyl(SO₃H)(HOSO₂) | yellow |
| 99. | 5-CH₃ | 5-CH₃ | 2-OCH₃ | 2-OCH₃ | " | " | orange |
| 100. | H | H | H | H | —NH—C₆H₄—SO₃H (para) | —NH—naphthyl(HOSO₂)(SO₃H)(HOSO₂) | yellow |
| 101. | 5-CH₃ | 5-CH₃ | 2-CH₃ | 2-CH₃ | " | " | yellowish orange |
| 102. | H | H | H | H | —NH—CH₂CH₂OH | " | yellow |
| 103. | H | H | H | H | —NH—C₆H₄—SO₃H (meta) | —NH—naphthyl(HOSO₂)(SO₃H)(HOSO₂) | yellow |
| 104. | H | H | H | H | " | —NHCH₂CH₂SO₃H | yellow |

TABLE 6-continued

Formula (1f): structure with Cl-triazine-NH-phenyl(R1,R2)-N=N-phenyl(SO3H)-CH=CH-phenyl(SO3H)-N=N-phenyl(R'1,R'2)-NH-triazine-Cl, with R4 and R'4 substituents on triazines.

| No. | R₁ | R'₁ | R₂ | R'₂ | R₄ | R'₄ | Shade |
|---|---|---|---|---|---|---|---|
| 105. | H | H | H | H | " | —NH—C₆H₃(SO₃H)(HOSO₂) (2,5-disulfo anilino) | yellow |
| 106. | H | H | 2-OCH₃ | 2-OCH₃ | —NH—C₆H₄—SO₃H | " | golden yellow |
| 107. | H | H | H | H | —N(CH₂CH₂OH)₂ | —NH—C₆H₃(SO₃H)(HOSO₂) | reddish yellow |
| 108. | —NHCONH₂ | =R₁ | H | H | " | —N(CH₃)CH₂CH₂SO₃H | brownish yellow |
| 109. | " | H | H | H | —NH—C₆H₃(SO₃H)(HOSO₂) | =R₄ | orange |
| 110. | " | 2-OCH₃ | H | H | " | " | orange |
| 111. | 5-CH₃ | H | 2-OCH₃ | H | " | " | golden yellow |
| 112. | H | H | H | H | —NH₂ | —NH—naphthyl(SO₃H)₂(HOSO₂) | yellow |
| 113. | H | H | H | H | —NH(CH₂)₃OCH₃ | " | yellow |
| 114. | H | H | 2-OCH₃ | 2-OCH₃ | —N(morpholino) | " | golden yellow |
| 115. | H | CH₃ | H | H | —C₆H₄—SO₃H (3-sulfo) | —C₆H₄—SO₃H (4-sulfo) | yellow |

TABLE 7

(Formula 1g)

| No. | R₄ | R₁ | R₂ |
|-----|----|----|----|
| 116. | —NHCH₂CH₂SO₃H | H | H |
| 117. | " | H | 5-NHCOCH₃ |
| 118. | " | 2-OCH₃ | 5-CH₃ |
| 119. | —N(CH₃)CH₂CH₂SO₃H | 2-OCH₃ | H |
| 120. | —NH—(2,5-disulfophenyl) (SO₃H at 4, HOSO₂ at position) | H | H |
| 121. | —NHCH₂CH₂COOH | H | 5-CH₃ |
| 122. | —N(CH₂COOH)₂ | H | H |
| 123. | —N(CH₂OH)₂ | H | 5-NHCONH₂ |
| 124. | —NH—CH₂CH₂—O—SO₃H | H | H |
| 125. | " | 2-CH₃ | 5-CH₃ |
| 126. | —NH—(3,6-disulfo-7-naphthyl) | H | H |
| 127. | —NHCH₂CH₂OH | 5-NHCOCH₃ | 2-SO₃H |
| 128. | —SCH₂CH₂COOH | H | H |
| 129. | —NCH₂—CH—OH—CH₂OH (on H); (4-sulfophenyl at R₂ position, positions 2,3) | | |
| 130. | —N(morpholino)—O | (4-sulfophenyl, positions 2,3) | |
| 131. | —NH(CH₂CH₂O)₂—H | H | H |
| 132. | —NH—(naphthyl-2,4-disulfo) | H | H |

TABLE 8

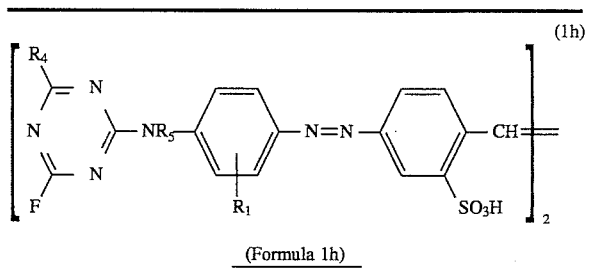

(Formula 1h)

| No. | R₄ | R₁ | R₅ |
|---|---|---|---|
| 133. | —NHCH₂CH₂OSO₃H | H | CH₃ |
| 134. | —NHCH₂CH₂SO₃H | H | CH₂CH₂OH |
| 135. | —N(CH₃)CH₂CH₂SO₃H | 2-OCH₃ | " |

TABLE 8-continued

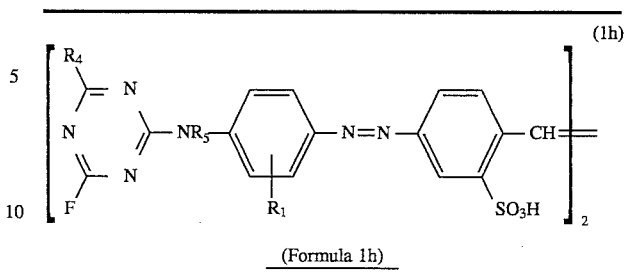

(Formula 1h)

| No. | R₄ | R₁ | R₅ |
|---|---|---|---|
| 136. | —NHCH₂CH₂OH | H | CH₂CH₂COOH |
| 137. | —HNCH₂CH₂SO₃H | " | —CH₂CH₂— |

TABLE 9

$$\begin{bmatrix} \text{structure of formula 1i} \end{bmatrix}$$

(Formula 1i)

| No. | R₁ | R'₁ | R₂ | R'₂ | R'₃ | R₄ | R'₄ |
|---|---|---|---|---|---|---|---|
| 138. | H | H | H | H | —NH₂ | —NH—C₆H₄—SO₃H (m) | =R₄ |
| 139. | H | H | H | H | —OH | " | " |
| 140. | H | H | H | H | —NH—C₆H₄—SO₃H (m) | " | —NHCH₂CH₂SO₃H |
| 141. | H | H | H | H | " | " | —N(morpholino)O |
| 142. | H | H | H | H | " | " | —N(CH₂CH₂—OH)₂ |
| 143. | H | H | H | H | —NH—C₆H₄—SO₃H (p) | —NH—C₆H₃(SO₃H)(HOSO₂)— | —NHCH₂CH₂OH |
| 144. | H | H | H | H | " | —NH—C₆H₄—SO₃H (p) | —N(CH₂CH₂OH)₂ |
| 145. | H | H | H | H | " | " | —NHNH₂ |

TABLE 10

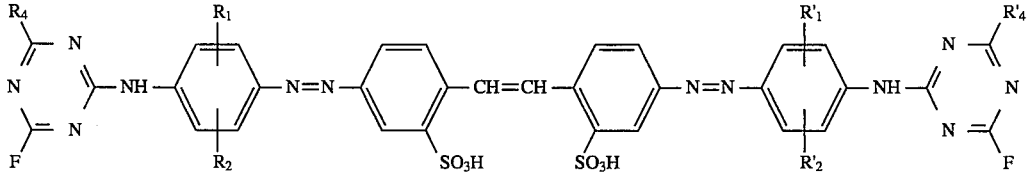

(Formula 1j)

| No. | R$_1$ | R'$_1$ | R$_2$ | R'$_2$ | R$_4$ | R'$_4$ |
|-----|-------|--------|-------|--------|-------|--------|
| 146. | H | H | H | H | —NHCH$_2$CH$_2$SO$_3$H | —NHCH$_2$CH$_2$OH |
| 147. | H | H | H | H | " | —N(CH$_3$)CH$_2$CH$_2$OH |
| 148. | H | H | H | H | " | —NHCH$_2$COOH |
| 149. | H | H | H | H | " | —N(CH$_2$CH$_2$OH)$_2$ |
| 150. | 3-CH$_3$ | 3-CH$_3$ | H | H | " | —SCH$_2$CH$_2$COOH |
| 151. | 3-CH$_3$ | H | H | H | " | =R$_4$ |
| 152. | H | H | 2-OCH$_3$ | H | " | =R$_4$ |
| 153. | H | H | H | H | —N(CH$_3$)CH$_2$CH$_2$SO$_3$H | —NHCH$_2$CH$_2$OH |
| 154. | H | H | H | H | " | —NH—C$_6$H$_4$—SO$_3$H (m) |
| 155. | H | H | H | H | " | —NH(CH$_2$)$_3$OCH$_3$ |

TABLE 11

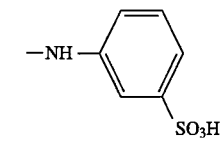

(Formula 1k)

| No. | R$_1$ | R'$_1$ | R$_2$ | R'$_2$ | R'$_3$ | R$_4$ | R'$_4$ |
|-----|-------|--------|-------|--------|--------|-------|--------|
| 156. | H | H | H | H | —NH$_2$ | —NCH$_2$CH$_2$SO$_3$H | =R$_4$ |
| 157. | H | H | H | H | —NHCH$_2$CH$_2$OH | " | =R$_4$ |
| 158. | 2-OCH$_3$ | 2-OCH$_3$ | H | H | —OH | " | =R$_4$ |

The following table shows the $\lambda_{max}$ values for the dyestuffs of examples 93 through 158.

| Exp. No. | $\lambda_{max}$ | Exp. No. | $\lambda_{max}$ |
|----------|-----------------|----------|-----------------|
| 93. | 429 | 126. | 426 |
| 94. | 432 | 127. | 448 |
| 95. | 437 | 128. | 423 |
| 96. | 428 | 129. | 452 |
| 97. | 448 | 130. | 453 |
| 98. | 427 | 131. | 428 |
| 99. | 448 | 132. | 427 |
| 100. | 430 | 133. | 411 |
| 101. | 430 | 134. | 412 |
| 102. | 426 | 135. | 426 |
| 103. | 429 | 136. | 410 |
| 104. | 431 | 137. | 433 |
| 105. | 430 | 138. | 430 |
| 106. | 435 | 139. | 429 |
| 107. | 431 | 140. | 431 |
| 108. | 461 | 141. | 430 |
| 109. | 442 | 142. | 432 |
| 110. | 453 | 143. | 429 |
| 111. | 434 | 144. | 432 |
| 112. | 428 | 145. | 430 |
| 113. | 429 | 146. | 429 |
| 114. | 436 | 147. | 430 |
| 115. | 430 | 148. | 427 |
| 116. | 427 | 149. | 430 |
| 117. | 451 | 150. | 434 |
| 118. | 446 | 151. | 433 |
| 119. | 438 | 152. | 434 |
| 120. | 426 | 153. | 431 |
| 121. | 431 | 154. | 427 |
| 122. | 428 | 155. | 430 |
| 123. | 454 | 156. | 434 |
| 124. | 427 | 157. | 433 |
| 125. | 424 | 158. | 437 |

Application Example A 70 parts of chemically bleached sulphite cellulose of pinewood and 30 parts of chemically bleached sulphite cellulose of birchwood are ground in a Holländer beater in 2000 parts of water. 0.2 parts of the dyestuff of example 1 are sprinkled into this pulp. After mixing for 20 minutes, paper is produced therefrom. The absorbent paper obtained in this way is dyed reddish yellow. The waste water is practically colourless.

Application Example B 0.5 parts of the dyestuff powder of example I are dissolved in 100 parts of hot water and cooled to room temperature. The solution is added to 100 parts of chemically bleached sulphite cellulose, which have been ground in a Hollander beater with 2000 parts of water. After thorough mixing for 15 minutes, sizing takes place in the usual way with rosin size and aluminium sulphate. Paper which is produced from this material has a reddish yellow shade, and has good waste-water and wet fastness, as well as good light fastness.

Application Example C

A length of unsized absorbent paper is drawn through a dyestuff solution of the following composition at 40°–50°:

0.5 parts of the dyestuff of example 1
0.5 parts of starch and
99.0 parts of water.

The excess dyestuff solution is squeezed out through two rollers. The dried length of paper is dyed reddish yellow.

Dyeing may also take place in a similar manner to that of examples A to C using the dyestuffs of examples 2 to 85, or resp. a dye preparation thereof. The paper dyeings obtained are yellow and have a high level of fastness.

Application Example D 50 parts of bleached pinewood sulphite cellulose and 50 parts of bleached beech cellulose (degree of beating 30°SR*) are mixed with 0.5 parts of the dyestuff of example 1 in water (pH 4, water hardness 10° dH). After 16 minutes, sheet formation takes place. The paper is dyed in an intense reddish/yellow shade. In contrast, a dyeing made at pH 7 shows no variation in depth or shade. The rate of exhaustion reaches 100% and the waste water is colourless.
*) °SR=Schopper Riegler degree Application Example E 100 parts of intermediate-dried chrome velours leather are drummed for one hour at 50° in a drum containing a bath of 400 parts of water, 2 parts of 25% ammonium hydroxide solution and 0.1 parts of a commercial wetting agent. The bath is subsequently drained. 400 parts of water of 60° and 1 part of 25% ammonium hydroxide solution are added to the drummed chrome velours leather which is still moist. After adding 5 parts of the dyestuff of example 1, dissolved in 200 parts of water, dyeing is effected for 90 minutes at 60°. Then, 50 parts of 8% formic acid are slowly added in order to acidify the pH. The treatment is then continued for a further 30 minutes. Finally, the leather is rinsed, dried and finished in the usual way. The yellow leather dyeing obtained is level.

Application Example F 1.1 parts of the dyestuff of example 1 are dissolved at 60° in 100 parts of demineralized water and subsequently diluted with 900 parts of cold, demineralized water. Then, 100 parts of cotton tricot (bleached) are added to the dye bath. After 5 minutes, 10 parts of calcined sodium sulphate and 2 parts of ammonium sulphate are added. During 70 minutes, the temperature of the dye bath is continuously raised to 98°. This temperature is maintained for 20 minutes and the dye bath is then cooled to 70° over the course of 30 minutes. The dyed material is rinsed for 2 minutes firstly with cold, demineralized water, and subsequently for 2 minutes with cold tap water, then centrifuged and dried. The cotton dyeing obtained is yellow.

Application Example G 100 parts of cotton tricot, which have been dyed with the dyestuff of example 1 analogously to the method of example F in ca. 1/1 standard depth, are mixed without intermediate drying in 1000 parts of tap water at 25° with 5 parts of sodium chloride and 4 parts of an after-treatment agent obtained from the reaction of diethylenetriamine with dicyandiamide. The pH value of the dye bath is set at 6.5–7. The bath is heated to 60° over the course of 20 minutes, and this temperature is maintained for a further 20 minutes. Afterwards, the material is rinsed with cold tap water. The yellow cotton dyeing which has been after-treated in this way has perfect washing fastness and very good light fastness.

Application Example H

A cotton dyeing produced with the dyestuff of example 1 analogously to the method of example F in 1/1 standard depth, is impregnated on a padder with a solution, which contains 100 g/l of an after-treatment agent obtained by reacting the after-treatment agent of example G with dimethyloldihydroxyethyleneurea and a hardening catalyst, and it is squeezed out to a pick-up of ca. 80%. It is subsequently shock-dried for 45 seconds on a tenter at a temperature of 175°–180°. The yellow cotton dyeing thus obtained is notable for its perfect washing fastness. At the same time, there is a considerable improvement in the creasing fastness, and reduced swelling value of the cellulosic fibres.

TRICHROMATIC DYEING EXAMPLE

Application Example I 0.6 parts of the dyestuff according to example 1, of formula:

1.14 parts of the dyestuff of Colour Index no. Direct Red 83:1 having a pure dyestuff content of 37.7% and 1.06 parts of the dyestuff of Colour Index no. Direct Blue 90 having a pure dyestuff content of 47.6%

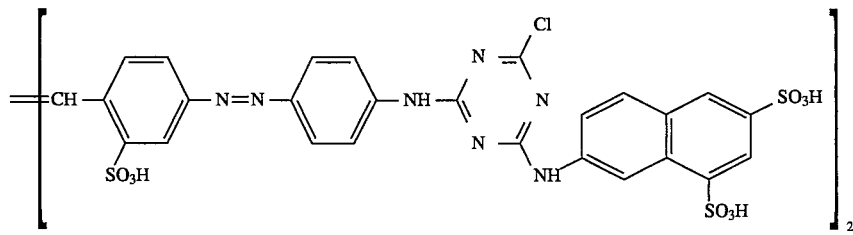

are each dissolved in 100 parts of demineralized water at 60° C.

The three solutions are added to 700 parts of cold demineralized water. Then, 100 parts of cotton tricot (bleached) are added to the dye bath. After 5 minutes, 10 parts of calcined sodium sulphate and 2 parts of ammonium sulphate are added. During 70 minutes, the temperature of the dye bath is continuously raised to 98°. This temperature is maintained for 20 minutes, and then the dye bath is cooled over the course of 30 minutes to 70°. The dyed material is rinsed for 2 minutes firstly with cold, demineralized water, and subsequently for 2 minutes with cold tap water, then centrifuged and dried. The cotton dyeing obtained is deep black.

Application Example J 100 parts of cotton tricot, which have been dyed in a deep black shade analogously to the method of example I, are mixed without intermediate drying in 1000 parts of tap water at 25° with 5 parts of sodium chloride and 4 parts of the after-treatment agent of example G. The pH value of the dye bath is set at 6.5–7. The bath is heated over the course of 20 minutes to 60° and this temperature is maintained for a further 20 minutes. Afterwards, the material is rinsed with cold tap water. The cotton dyeing thus after-treated has very good washing and light fastness.

DYEING EXAMPLES FOR HOT AND COLD DYERS

In the following are illustrated the possibiities of use for the described reactive dyes. The dyes of formula I with $R_3$=Cl may be used in accordance with application directions K and the dyes of formula I with $R_3$=F in accordance with application directions L.

Application directions K

A dye bath consisting of 1000 parts of demineralized water, 80 parts of Glauber's salt (calcined), 1 pan of the sodium salt of 1-nitrobenzene-3-sulphonic acid and 1 pan of the dyestuff of example 1 is heated over the course of 10 minutes to 80° C. Then, 100 parts of mercerized cotton are added. Dyeing is effected for 5 minutes at 80° C., and then heating is effected over the course of 15 minutes to 95° C. After 10 minutes at 95° C., 3 parts of soda are added, after 20 minutes a further 7 parts of soda and after 30 minutes at 95° C. another 10 parts of soda. Dyeing subsequently continues for 60 minutes at 95° C. Then, the dyed material is removed from the dye bath, rinsed for 2 minutes in running, demineralized water of 60° C.±10° C. and for 1 minute in running tap water of 60° C.±10° C. The material is then washed twice for 10 minutes, each time in 5000 parts of boiling, demineralized water, then subsequently rinsed for 2 minutes in running, demineralized water of 60° C.±10° C., 1 minute in running tap water of 60° C.±10° C. and 1 minute in cold tap water. After drying, a yellow cotton dyeing with good fastness is obtained.

Application directions L

A dye bath consisting of 1000 parts of demineralized water, 80 parts of Glauber's salt (calcined) and 1 part of the dyestuff of example 116 is heated over the course of 10 minutes to 50° C. Then, 100 parts of mercerized cotton are added. After 25 minutes at 50° C., 0.7 parts of soda are added, after 20 minutes a further 1.3 parts of soda and after 30 minutes at 50° C. another 2 parts of soda. The bath is subsequently heated over the course of 15 minutes to 60° C. and dyeing continues for 60 minutes at 60° C. Then, the dyed material is removed from the dye bath, rinsed for 2 minutes in running demineralized water of 60° C.±10° C. and for 1 minute in running tap water of 60° C.±10° C. The material is then washed twice for 10 minutes, each time in 5000 parts of boiling demineralized water, then subsequently rinsed for 2 minutes in running, demineralized water of 60° C.±10° C., 1 minute in running tap water of 60° C.±10° C. and 1 minute in cold tap water. After drying, a yellow cotton dyeing with good fastness is obtained.

The dyestuffs of examples 5 to 62 and 93 to 158, or dyestuff mixtures thereof, may be used for dyeing cotton in analogous manner to that described in examples K and L. Brilliant yellow dyeings are obtained, which have good fastness properties.

| Application directions M A printing paste having the components | |
|---|---|
| 40 | parts of the dyestuff of example 1 |
| 100 | parts of urea |
| 330 | parts of water |
| 500 | parts of a 4% sodium alginate thickener |
| 10 | parts of the sodium salt of 1-nitrobenzene-3-sulphonic acid |
| 20 | parts of soda |
| 1000 | parts in all | is applied to cotton material by conventional printing processes.

The printed and dried material is steamed for 4–8 minutes at 102°–105° C. and then given a cold and a hot rinse. The fixed cotton material is subsequently washed at the boil.

We claim:

1. A disazo dyestuff according to formula I

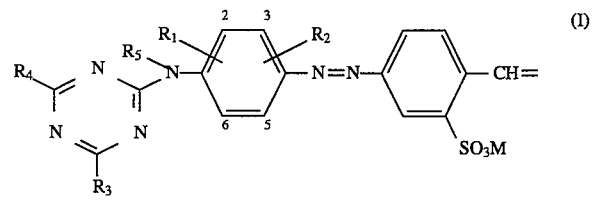

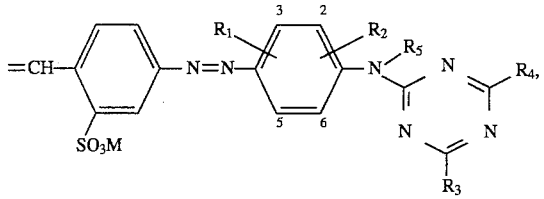

wherein:
the two $R_1$ independently signify hydrogen or a substituent selected from: halogen, amino, alkyl, hydroxy, alkoxy, alkylamino, dialkylamino, acylamino, aryl or aryloxy; or together with $R_2$ or $R_5$ form an optionally substituted carbocyclic or heterocyclic ring;

the two $R_2$ independently signify hydrogen or a substituent selected from: halogen, acyl, alkyl, cyano, carboxyl, acylamino, alkyl- or phenylsulphonyl, sulphonic acid or alkoxy; or together with $R_1$, signify the atoms required to complete an optionally substituted carbocyclic or heterocyclic ring;

the two $R_3$ independently signify a substituent selected from: chlorine, fluorine, alkyl- or arylsulphonyl, sulphonic acid or an optionally substituted hydroxyl, mercapto, hydrazino and amino;

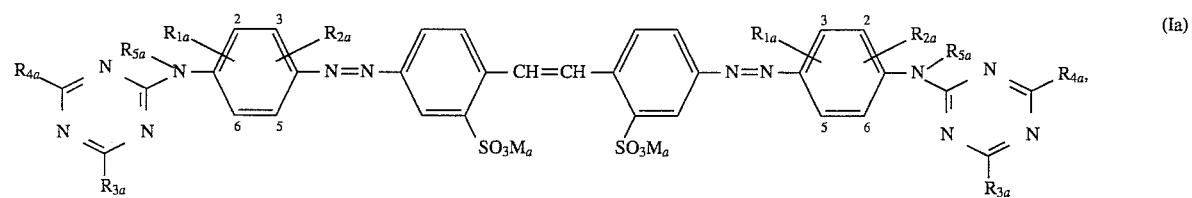

the two $R_4$ independently signify an amino group bearing one or two substituents, a N-morpholyl, N-piperazyl or N-piperidyl group;

the two $R_5$ independently signify hydrogen or an aliphatic or cycloaliphatic radical which may be optionally substituted, or $R_5$ with $R_1$ forms an optionally substituted heterocyclic ring, and the two M independently signify hydrogen or a monocationic group and, apart from the fact that $R_3$ may be chlorine or fluorine, no reactive groups are present.

2. A disazo dyestuff according to claim 1, wherein $R_1$ signifies $R_{1a}$ as hydrogen, chlorine, methyl, ethyl, hydroxy, $C_{1-2}$-alkoxy, $C_{1-2}$-alkoxyethoxy, $C_{1-2}$-alkylcarbonylamino, aminocarbonylamino or $C_{1-2}$-alkylsulphonylamino.

3. A disazo dyestuff according to claim 1, wherein $R_2$ signifies $R_{2a}$ as hydrogen, methyl, methoxy, chlorine, carboxy, aminocarbonyl, sulpho or aminosulphonyl.

4. A disazo dyestuff according to claim 1, wherein the ring formed by $R_1$ and $R_2$ is a benzo ring, which may be substituted by a —$SO_3H$ group.

5. A disazo dyestuff according to claim 1, wherein $R_3$ signifies $R_{3a}$ as chlorine, fluorine, hydroxyl, $C_{1-4}$-alkylmercapto, amino, mono- or di-$C_{1-4}$-alkylamino, whereby the alkyl groups are optionally substituted by hydroxy, alkoxy, carboxy or sulpho; or phenyl- or toluidylamino substituted by sulphonic acid groups; or N-morpholino.

6. A disazo dyestuff according to claim 1, wherein $R_4$ signifies $R_{4a}$ as amino, mono- or di-$C_{1-4}$-alkylamino, mono- or di-(hydroxy-$C_{2-4}$-alkyl)-amino, mono- or di-(carboxy-$C_{1-2}$alkyl)-amino, N-$C_{1-2}$alkyl-N-(carboxy-$C_{1-2}$alkyl)-amino, N-$C_{1-2}$-alkyl-N-(hydroxyethyl)-amino, $C_{2-4}$alkylamino, wherein the alkyl radical bears one or two hydroxyl or carboxylic acid groups or a cyano, sulphonic acid, —O—$SO_3H$, aminocarbonyl, $C_{1-2}$alkoxy, hydroxyethoxy or carboxymethoxy group; or a N-morpholyl or a phenylamino group, wherein the phenyl nucleus optionally bears one or two substituents selected from the group consisting of carboxyl, sulpho, hydroxyl, $C_{1-2}$alkoxy, β-hydroxyethoxy, aminocarbonyl, aminosulphonyl, aminocarbonylamino, hydroxyethylsulphonyl, hydroxyethylaminosulphonyl, —$OCH_2CH_2OSO_3M$ and —$NHCOCH_2CH_2COOH$; or naphthylamino optionally bearing up to three sulphonic acid groups.

7. A disazo dyestuff according to claim 1, wherein $R_5$ signifies $R_{5a}$ as hydrogen, $C_{1-4}$-alkyl or hydroxy-$C_{2-4}$-alkyl.

8. A disazo dyestuff according to claim 1, wherein M signifies $M_a$ as hydrogen, a lithium, sodium or potassium ion or a cation of formula $NH_4^{3\oplus}$, $(C_{1-4}alkyl)_{1-4}$-ammonium or (hydroxy-$C_{2-4}$-alkyl)$_{1-4}$-ammonium.

9. A disazo dyestuff according to claim 1, wherein the two $R_1$'s, the two $R_2$'s and the two $R_5$'s respectively have the same significances.

10. A disazo dyestuff according to claim 1, which is symmetrical.

11. A disazo dyestuff according to claim 1, of formula Ia wherein
$R_{1a}$ is hydrogen, chlorine, methyl, ethyl, hydroxy, $C_{1-2}$-alkoxy, $C_{1-2}$alkoxyethoxy, $C_{1-2}$alkylcarbonylamino, aminocarbonylamino or $C_{1-2}$alkylsulphonylamino; $R_{2a}$ is hydrogen, methyl, methoxy, chlorine, carboxy, aminocarbonyl, sulpho or aminosulphonyl; $R_{3a}$ is chlorine, fluorine, hydroxyl, $C_{1-4}$alkylmercapto, amino, mono- or di-$C_{1-4}$alkylamino, whereby the alkyl groups are optionally substituted by hydroxy, alkoxy, carboxy or sulpho; or phenyl- or toluidylamino substituted by sulphonic acid groups; or N-morpholino; $R_{4a}$ is amino, mono- or di-$C_{1-4}$alkylamino, mono- or di-(hydroxy-$C_{2-4}$-alkyl)-amino, mono- or di-(carboxy-$C_{1-2}$-alkyl)-amino, N-$C_{1-2}$alkyl-N-(carboxy-$C_{1-2}$alkyl)-amino, N-$C_{1-2}$-alkyl-N-(hydroxyethyl)-amino, $C_{2-4}$alkylamino, wherein the alkyl radical bears one or two hydroxyl or carboxylic acid groups or a cyano, sulphonic acid, —O—$SO_3H$, aminocarbonyl, $C_{1-2}$-alkoxy, hydroxyethoxy or carboxymethoxy group; or a N-morpholyl or phenylamino group, wherein the phenyl nucleus optionally bears one or two substituents selected from the group consisting of carboxyl, sulpho, hydroxyl, $C_{1-2}$-alkoxy, β-hydroxyethoxy, aminocarbonyl, aminosulphonyl, aminocarbonylamino, hydroxyethylsulphonyl, hydroxyethylaminosuphonyl, —$OCH_2CH_2OSO_3M$ and —$NHCOCH_2CH_2COOH$; or naphthylamino optionally bearing up to three sulphonic acid groups; $R_{5a}$ is hydrogen, $C_{1-4}$alkyl or hydroxy-$C_{2-4}$alkyl; and $M_a$ is hydrogen, a lithium, sodium or potassium ion or a cation of formula $NH_4^+$, $(C_{1-4}alkyl)_{1-4}$-ammonium or (hydroxy-$C_{2-4}$alkyl)$_{1-4}$-ammonium, whereby the symbols $R_{1a}$ and $R_{2a}$ may also form a benzo ring, which may be substituted by a —SO$_3$H group.

12. A disazo dyestuff according to claim 11, wherein the two $R_{1a}$'s and the two $R_{2a}$'s respectively are identical.

13. A disazo dyestuff according to claim 12, wherein $R_{4a}$ is ethylamino, wherein the ethyl radical bears a sulphonic acid group; or a phenylamino group, wherein the phenyl nucleus bears one or two sulphonic acid substituents; or naphthylamino bearing up to three sulphonic acid groups.

14. A disazo dyestuff according to claim 11, wherein $R_{1a}$ is hydrogen, methyl, methoxy or acetylamino; $R_{2a}$ is hydrogen, methyl or methoxy; $R_{3a}$ is chlorine, fluorine, mono- or di-$C_{1-4}$-alkylamino, whereby the alkyl groups are optionally substituted by hydroxy, alkoxy, carboxy or sulpho; or phenylamino substituted by sulphonic acid groups; $R_{4a}$ is mono- or di-(($\beta$-hydroxyethyl)-amino, ethylamino, wherein the ethyl radical bears a carboxylic acid, sulphonic acid, O—SO$_3$H or hydroxyethoxy group; or a phenylamino group, wherein the phenyl nucleus bears one or two carboxyl or sulphonic acid substituents; or naphthylamino bearing in particular up to three sulphonic acid groups; $R_{5a}$ is hydrogen; and $M_a$ is hydrogen, a lithium, sodium or potassium ion or a cation of formula NH$_4^+$, $(C_{1-4}$-alkyl)$_{1-4}$-ammonium or (hydroxy-$C_{2-4}$alkyl)$_{1-4}$ammonium.

15. A disazo dyestuff according to claim 11, which is symmetrical.

16. A disazo dyestuff according to claim 15, wherein $R_{3a}$ or $R_{3b}$ signifies Cl.

17. A disazo dyestuff according to claim 1 wherein $R_1$ signifies $R_{1b}$ as hydrogen, methyl, methoxy or acetylamino.

18. A disazo dyestuff according to claim 1 wherein $R_1$ is hydrogen.

19. A disazo dyestuff according to claim 1 wherein $R_2$ signifies $R_{2b}$ as hydrogen, methyl or methoxy.

20. A disazo dyestuff according to claim 1 wherein $R_2$ is hydrogen.

21. A disazo dyestuff according to claim 1 wherein $R_3$ signifies $R_{3b}$ as chlorine; fluorine; mono- or di-$C_{1-4}$-alkylamino, whereby the alkyl groups are optionally substituted by hydroxy, alkoxy, carboxy or sulpho; or phenylamino substituted by sulphonic acid groups.

22. A disazo dyestuff according to claim 1 wherein $R_4$ signifies $R_{4b}$ as mono- or di-($\beta$-hydroxyethyl)-amino; ethylamino, wherein the ethyl radical bears a carboxylic acid sulphonic acid, —O—SO$_3$H or hydroxyethoxy group; a phenylamino group, wherein the phenyl nucleus bears one or two carboxyl or sulphonic acid substituents; or naphthylamino bearing up to three sulphonic acid groups.

23. A disazo dyestuff according to claim 1 wherein $R_4$ signifies $R_{4c}$ as ethylamino, wherein the ethyl radical bears a sulphonic acid group; a phenylamino group, wherein the phenyl nucleus bears one or two sulphonic acid substituents; or naphthylamino bearing up to three sulphonic acid groups.

24. A disazo dyestuff according to claim 1 wherein $R_5$ is hydrogen.

25. A disazo dyestuff according to claim 11 wherein $R_{1a}$ signifies $R_{1b}$ as hydrogen, methyl, methoxy or acetylamino.

26. A disazo dyestuff according to claim 11 wherein $R_{1a}$ is hydrogen.

27. A disazo dyestuff according to claim 11 wherein $R_{2a}$ signifies $R_{2b}$ as hydrogen, methyl or methoxy.

28. A disazo dyestuff according to claim 11 wherein $R_{3a}$ signifies $R_{3b}$ as chlorine; fluorine; mono- or di-$C_{1-4}$-alkylamino, whereby the alkyl groups are optionally substituted by hydroxy, alkoxy, carboxy or sulpho; or phenylamino substituted by sulphonic acid groups.

29. A disazo dyestuff according to claim 11 wherein $R_{4a}$ signifies $R_{4b}$ as mono- or di-($\beta$-hydroxyethyl)-amino; ethylamino, wherein the ethyl radical bears a carboxylic acid, sulphonic acid, —O—SO$_3$H or hydroxyethoxy group; a phenylamino group, wherein the phenyl nucleus bears one or two carboxyl or sulphonic acid substituents; or naphthylamino bearing up to three sulphonic acid groups.

30. A disazo dyestuff according to claim 11 wherein $R_{4a}$ signifies $R_{4c}$ as ethylamino, wherein the ethyl radical bears a sulphonic acid group; a phenyl amino group, wherein the phenyl nucleus bears one or two sulphonic acid substituents; or naphthylamino bearing up to three sulphonic acid groups.

31. A disazo dyestuff according to claim 11 wherein $R_{5a}$ is hydrogen.

32. A disazo dyestuff according to claim 14 wherein $R_{1a}$ is hydrogen.

33. A disazo dyestuff according to claim 14 wherein $R_{2a}$ is hydrogen.

34. A disazo dyestuff according to claim 14 wherein $R_{4a}$ is a phenylamino group, wherein the phenyl nucleus bears one or two sulphonic acid substituents.

35. A disazo dyestuff according to claim 6 wherein $R_4$ signifies $R_{4a}$ as mono- or di-($\beta$-hydroxyethyl)-amino.

36. A disazo dyestuff according to claim 11 wherein $R_4$ signifies $R_{4a}$ as mono- or di-($\beta$-hydroxyethyl)-amino.

37. A disazo dyestuff according to claim 1 with the following formula (1)

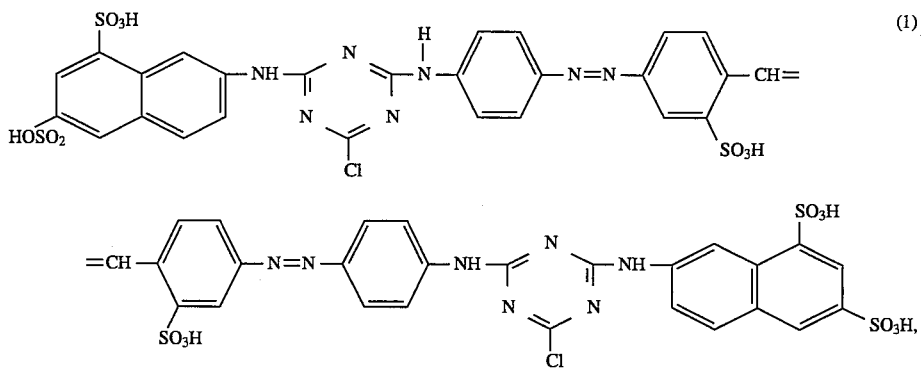

38. A process for dyeing or printing a substrate comprising applying to the substrate a compound according to claim 1.

39. A process according to claim 38 wherein said substrate is selected from the group consisting of organic substrates containing hydroxyl, thiol or amido groups, paper, and natural or regenerated cellulose.

40. A process according to claim 38 wherein the two $R_3$ are both fluorine and the substrate is immersed in a dyebath having a temperature of 40°–70° C.

41. A process according to claim 38 wherein the two $R_3$ are both chlorine and the substrate is immersed in a dyebath having a temperature of 60°–100° C.

42. A process for producing an ink comprising adding to a suitable solvent a compound according to claim 1.

43. A process for preparing a transparent, optically polarizing sheet or film comprising applying to a transparent sheet or film a compound according to claim 1.

* * * * *